United States Patent [19]

Peterson

[11] 4,377,064
[45] Mar. 22, 1983

[54] ROD PRESS FRUIT HARVESTER

[75] Inventor: Donald L. Peterson, Martinsburg, W. Va.

[73] Assignee: The United States of America as represented by the Secretary of Agriculture, Washington, D.C.

[21] Appl. No.: 322,332

[22] Filed: Nov. 18, 1981

[51] Int. Cl.³ .................................... A01D 46/20
[52] U.S. Cl. .......................... 56/328 R; 56/DIG. 2
[58] Field of Search ........... 56/328 R, 330, 327 R, 56/339, DIG. 2

[56] References Cited

U.S. PATENT DOCUMENTS

| | | | |
|---|---|---|---|
| 79,292 | 6/1868 | Lament et al. | 56/339 |
| 1,043,168 | 11/1912 | Stiles | 56/328 R |
| 3,040,507 | 6/1962 | Lasswell, Jr. | 56/328 |
| 3,077,720 | 2/1963 | Grove et al. | 56/328 |
| 3,127,725 | 4/1964 | Richardson | 56/328 |
| 3,129,551 | 4/1964 | Lasswell, Jr. | 56/328 R |
| 3,153,311 | 10/1964 | Pool | 56/328 |
| 3,164,942 | 1/1965 | Middlesworth et al. | 56/328 |
| 3,205,644 | 9/1965 | Gordiwier | 56/328 R |
| 3,347,587 | 10/1967 | Frost | 294/87 |
| 3,380,235 | 4/1968 | Smith et al. | 56/328 |
| 3,404,521 | 10/1968 | Thorn et al. | 56/328 |
| 3,405,515 | 10/1968 | Dittmer | 56/328 |
| 3,418,797 | 12/1968 | Meyerhoffer | 56/328 |
| 3,421,304 | 1/1969 | Phillips, Jr. | 56/328 |
| 3,447,293 | 6/1969 | Townsend | 56/328 |
| 3,460,328 | 8/1969 | Lee | 56/328 |
| 3,464,195 | 9/1969 | Crichfield | 56/328 |
| 3,552,107 | 1/1971 | Swift | 56/328 |
| 3,813,860 | 6/1974 | Cecchi | 56/328 R |
| 3,827,221 | 8/1974 | Chen | 56/328 R |
| 3,987,608 | 10/1976 | Wilcox, Jr. | 56/328 R |
| 4,208,860 | 6/1980 | Edwards | 56/328 R |

Primary Examiner—Robert Peshock
Assistant Examiner—John G. Weiss
Attorney, Agent, or Firm—M. Howard Silverstein; William E. Scott; David G. McConnell

[57] ABSTRACT

A rod press fruit harvester having a plurality of fruit removing rods combined with a mechanism for allowing movement of the harvester through a fruiting canopy without damage to limbs and branches of the tree. The harvester is also provided with mechanisms for automatically removing or clearing it of branches and debris and for repositioning rods which are moved out of operating position during the harvesting operation.

14 Claims, 12 Drawing Figures

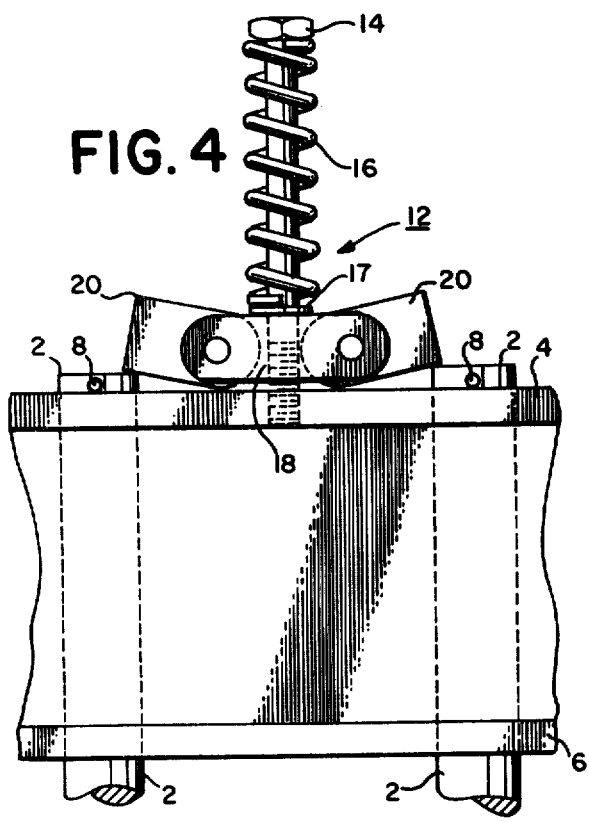
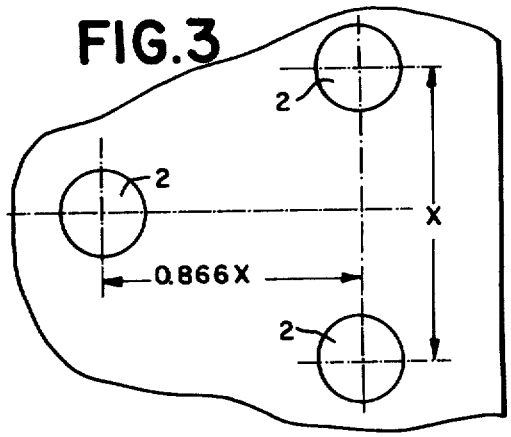
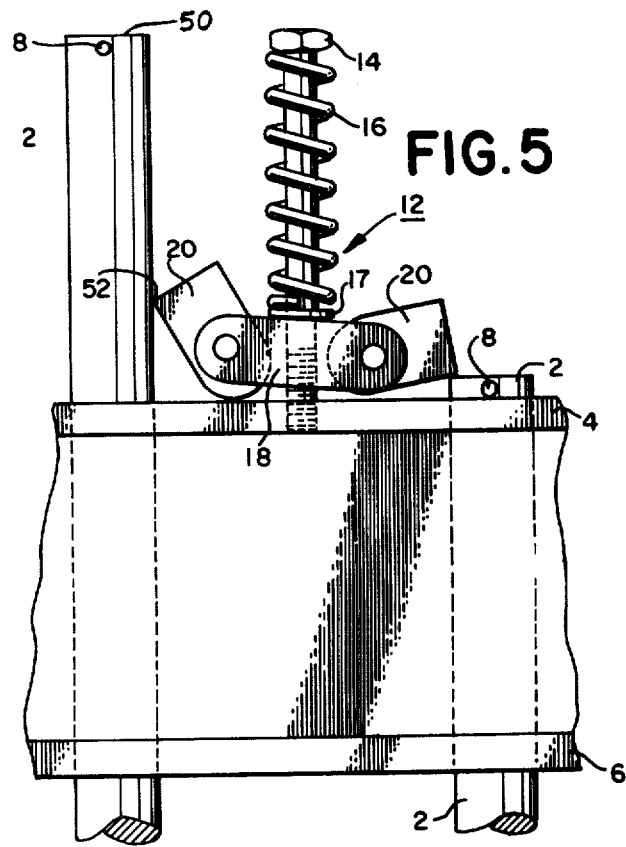
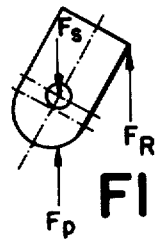
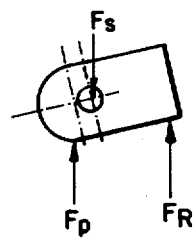

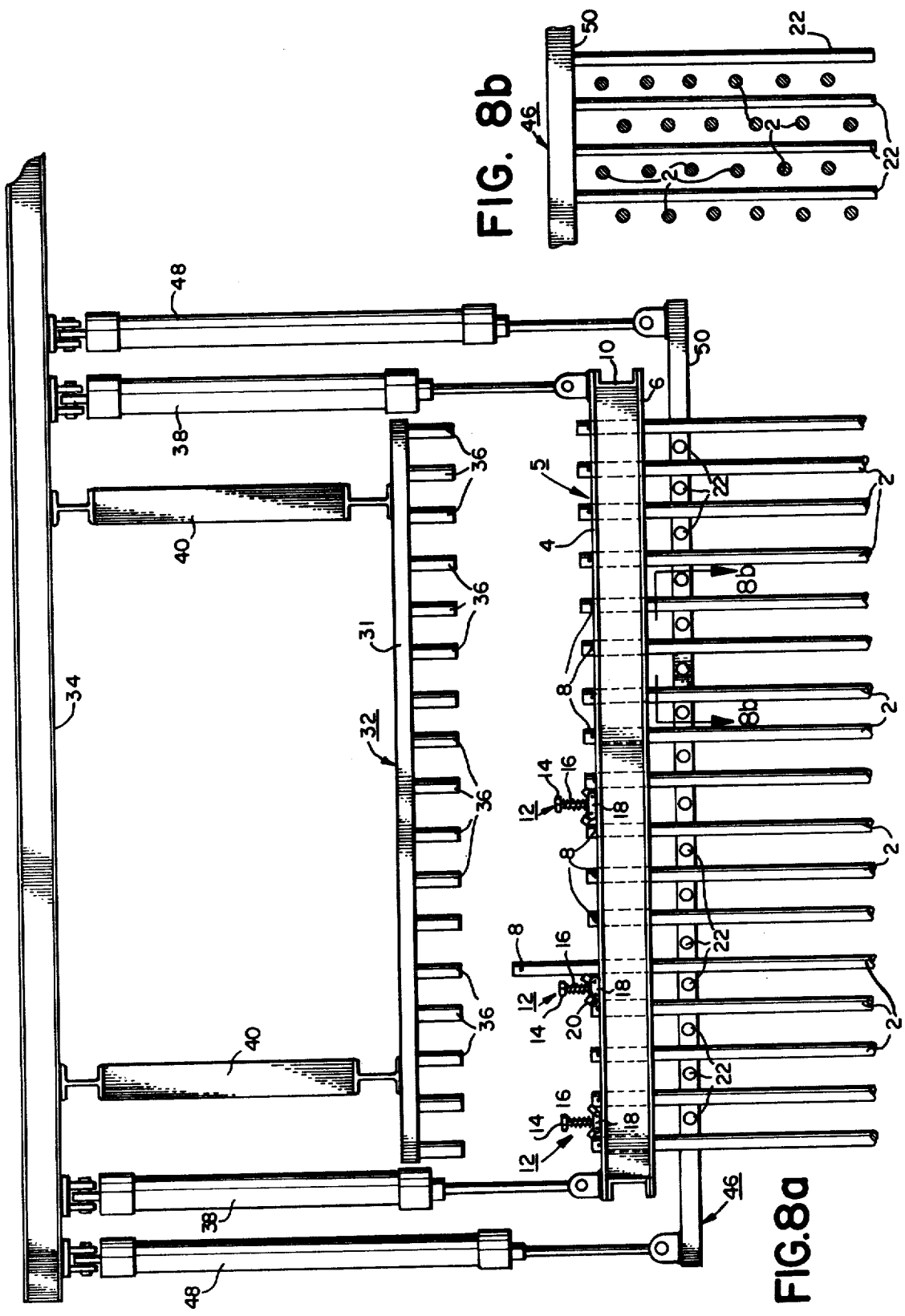

ROD PRESS FRUIT HARVESTER

BACKGROUND OF THE INVENTION

1. Field of the Invention

This invention relates to an apparatus for removing or harvesting fruit and more particularly to an apparatus that will harvest fruit especially from narrow fruit growing canopies by pressing the fruit out of the production canopy.

2. Description of the Art

Conventional fruit harvesters use an inertia shaker to remove fruit from trees. These harvesters do not physically contact the fruit. However, damage can occur with this mode of action because of movement of both the three limbs and the fruit during detachment. Other types of fruit removal apparatus have also been described. For example, one type is inserted into the fruiting canopy and hooks around the fruit and rakes the fruit off while being pulled out of the canopy, a second type has a number of equally spaced fingers lying in the same plane that are raked through the outer fruiting canopy of trees to strip off the fruit, and a third type has a series of rods of varying designs usually in a square pattern that are inserted into the fruiting canopy and remove fruit by rotating or reciprocating the rods.

SUMMARY OF THE INVENTION

It is an object of this invention to remove fruit from a tree without damaging the fruit.

It is also an object of this invention to remove mature fruit from the tree without removing or injuring the immature fruit.

A further object of this invention is to provide an apparatus which harvests fruit by pressing it from the fruiting canopy rather than by picking or raking it off.

Another object is to provide a harvesting apparatus that will not injure the tree from which fruit is being harvested.

Still another object is to provide an apparatus which can be used manually as well as being the prime component of a mobile mechanical harvester.

Another further object is to provide an apparatus which is especially useful in removing fruit from V-shaped and T-shaped canopies.

Still a further object is to provide an apparatus that can be used to harvest a variety of different fruits.

A still further object is to provide an apparatus designed so that it can be easily and simply modified to selectively remove any particular size fruit.

Another still further object is to provide an apparatus having an automatic mechanism for preventing damage to the limbs of the tree from which fruit is being harvested.

Another object is to provide an apparatus which can be operated in conjunction with a fruit catching mechanism in such a way that injury to the fruit is avoided.

Another object is to provide an apparatus in which an automatic mechanism is provided for resetting the apparatus to its original or initial operating configuration.

A still further object is to provide an apparatus having an automatic mechanism for clearing out of the apparatus any limbs or branches which may be caught in the apparatus as the apparatus is used to remove fruit from the tree.

In general, the above objects are accomplished by an apparatus comprised of a frame, a rod press fruit removal mechanism having a plurality of fruit removing rods or fingers combined with frame members or rod support and rod positioning means for removably mounting the rods, a plurality of spring-tensioned rod-release mechanisms mounted on the rod support means to allow for movement of the apparatus through the fruiting canopy to remove the desired sized fruit without damage to the limbs and branches of the tree, a retraction-assist mechanism to automatically remove or clear the apparatus of any branches or other debris, and a fruit removing rod repositioning mechanism.

BRIEF DESCRIPTION OF THE DRAWINGS

FIG. 3 is a sectional top view showing the spacing of the rods.

FIG. 4 is an enlarged view of the rod hold-down and release mechanism. The tabs in this drawing are shown holding the rods in operating position.

FIG. 5 is an enlarged view showing the position of the tab and rod on the left after that rod has engaged a non-yielding object and been released by the tab.

FIGS. 6 and 7 show the forces applied through a hold-down tab when it is in released position (FIG. 6) and when it is in initial position (FIG. 7).

FIG. 8a is the same as FIG. 8 only with rod press fruit removal mechanism in an extended position.

FIG. 8b is a section view at 8b—8b in FIG. 8a.

DESCRIPTION OF THE INVENTION

Figure 1:
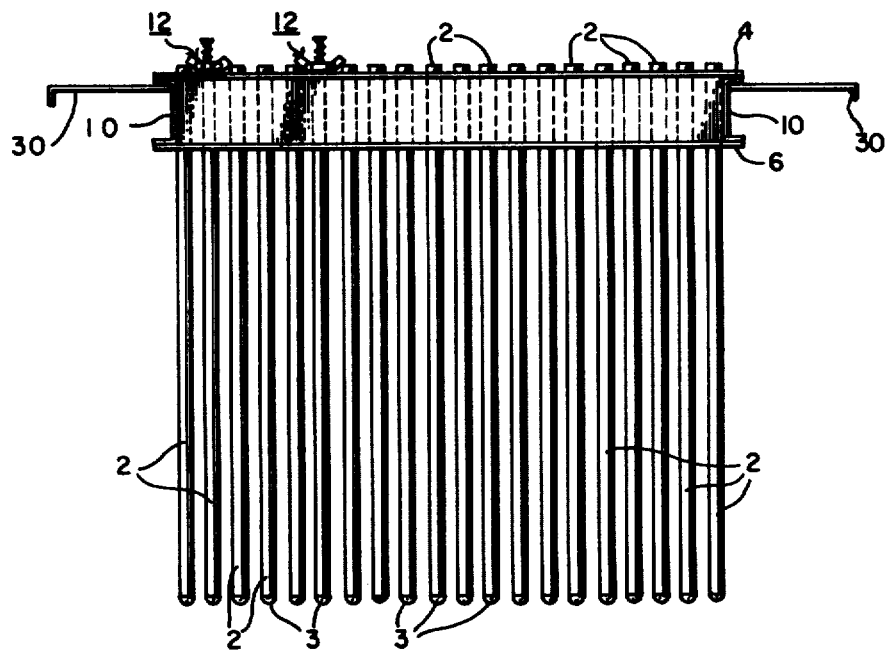
FIG. 1 is a side view showing the rod press fruit removal mechanism. Two of the rod hold-down and release mechanisms are also shown for illustrative purposes.

The apparatus of this invention is especially useful in removing fruit from T-shaped and V-shaped fruiting canopies. The apparatus has a plurality of fruit removing rods or fingers. Although the terms rods or fingers are preferred other terms may be used without altering the concept of the invention. The rods, which can be made of any material as long as the material is rigid or can be made rigid, have longitudinal axes and substantially circular cross-sections. The rods are provided with soft rubber tips to prevent damage when the tip of the rod engages the fruit. The length and diameter of the rods are varied depending on the depth of the fruiting canopy and the size of the fruit to be removed. In any given harvesting operation rods are used that extend beneath the lower frame member for a length that is equal to or longer than the depth of the fruiting canopy which is being harvested. This assures that no part of the harvester except the rods enters the canopy. The rods are removably mounted in a rod-support and positioning means which is comprised of a pair of plates or frame members in which each member is disposed in generally parallel attitude with respect to the other member. Each frame member is generally a flat metal plate although other materials can be used and would fall within the scope of the invention. Each frame member or plate has a plurality of drilled holes that are equally spaced in a triangular pattern and identically positioned in each plate. The frame members or plates are spaced a predetermined distance apart and are perpendicular to the longitudinal axes of the rods. The rods are positioned in the drilled holes in the plates and are prevented from dropping out by a pin or other suitable device near the upper end of each rod. On the top surface of the upper frame member there is provided a plurality of rod hold-down and release mechanisms, each of which has a tensioning bolt, a compression spring, a forced transmission link or block, a washer or other suitable flat disc or force bearing surface, and two hold-down and release tabs. The washer provides a force bearing surface between the compression spring and the transmission line or block. The force or tension applied to the hold-down release mechanisms is adjustable to provide for the different forces required for harvesting various crops. Each of these mechanisms is positioned to function for two of the rods, that is, each hold-down tab keeps one rod in operating position and, when the tip of a rod engages a non-yielding or immovable object the tab releases and allows the rod to remain stationary while the harvester continues traveling through the canopy. Consequently, when the harvester has traveled its maximum distance into the canopy and is about to be retracted, any rod which had engaged a non-yielding object during the harvesting operation would be projecting above the upper frame member. The length by which a so-engaged rod projects upwardly depends on the depth in the canopy at which the rod engaged a non-yielding object. In order to meet this contingency, the harvester is provided with a mechanism for automatically repositioning into their initial operating positions any such projecting rods. The mechanism consists essentially of a stationary plate above and parallel to the upper rod positioning frame member. The plate has the same dimensions of length and width as that of the rod positioning frame members and is attached to and supported by the frame of the harvester. The lower surface of the plate is provided with short studs spaced and positioned in a pattern identical to that of the drilled holes in the frame members. Consequently, there is a stud directly over the top of each rod. As the rods are retracted from the canopy, the top of any upwardly projecting rod contacts its corresponding stud and is pushed downward almost to its initial operating position. Final repositioning of the rod to its initial operating position is accomplished by the force applied through the hold-down tab. When the fruit removal mechanism is completely retracted there is a slight clearance between the top of the rods and the studs.

The forced transmission block and hold-down tabs are designed so that the tabs are reset as the rods are repositioned into their initial operating positions.

In the preferred mode of operation, a panel of the fruit removing rods or fingers would be moved downward through the fruit growing canopy. An energy-absorbing collector/conveyor surface would be positioned directly under the fruit growing canopy to catch and collect the fruit pressed from the canopy by the rods. As the apparatus is pulled back out of the canopy, rods would automatically be repositioned and all hold-down/release devices would be automatically reset for the next operation. The apparatus has the flexibility of adapting to different size grower conditions by simply changing the size of the panel used for removing the fruit. The diameter of the rods and their spacing determines the size of the fruit to be removed.

In the event that the fruiting canopy is not stiff enough to stay in position while the rods or fingers of the apparatus are pushed through it, a canopy-support mechanism or device can be used to prevent movement of the canopy away from the fingers. One of the simplest devices for this purpose is a rod attached to the fruit collector/conveyor in such a fashion that it can be manipulated to support the canopy.

A retraction-assist or tree limb removal mechanism is also provided for use while retracting the apparatus from the fruiting canopy after fruit removal. This is used when some tree limbs or branches are caught in and pulled up with the apparatus. The retraction-assist mechanism has one or more or a series of rods or fingers whose longitudinal axes are parallel to the plane of the frame members and perpendicular to the longitudinal axes of the fruit removing rods or fingers. The mechanism may have a rod or finger for every row of the fruit removing rods but this is not always necessary or desirable. In some instances one rod may suffice. The rods are removably attached to and supported by one or more bars or other suitable support means. This mechanism is positioned so that the rods are directly underneath the lower frame member. After the fruit removal rods have been inserted through the fruiting canopy, the retraction-assist mechanism, which is operated by hydraulic means, is held in position against the canopy while the fruit removing fingers are retracted. As the fruit removing fingers are retracted the retraction-assist mechanism strips limbs and branches out of the apparatus. When the fruit removing rods are fully retracted from the fruiting canopy, the retraction-assist mechanism is returned to its initial position in which its rods are directly underneath the lower frame member.

Figure 2:
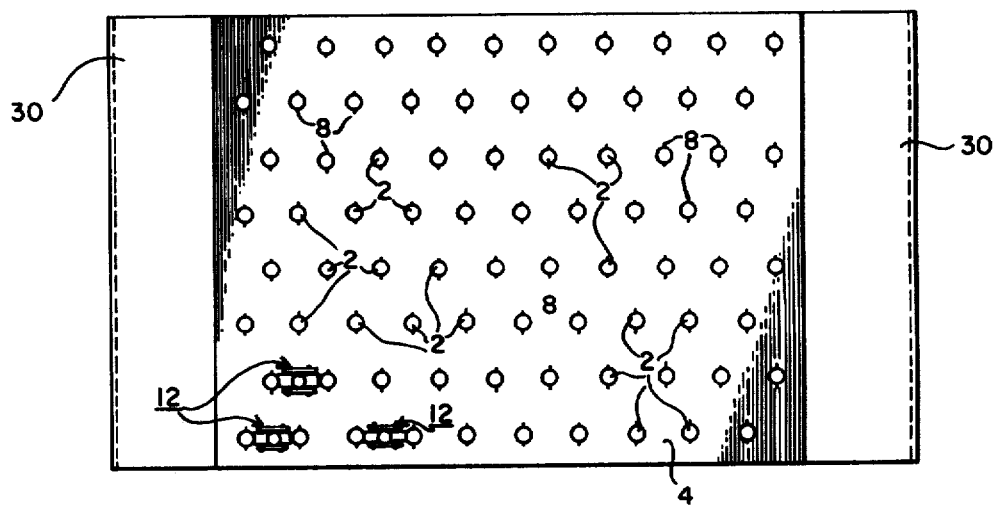
FIG. 2 is a top view showing the arrangement of the rods. It also illustrates the positions of the rod hold-down and release mechanisms.

As shown in the figures, the essential elements of the invention are the rod press fruit removal mechanism 5 having rods or fingers 2, and frame members or rod-positioning plates 4 and 6, the rod hold-down and release mechanisms 12, the retraction-assist mechanism 46, and the automatic rod repositioning mechanism 32. Also included as part of the total harvesting system is frame 34 for supporting the system and combining it through boom assembly 42 with a tractor or other suitable mobile means, mobile means 44, canopy support device 26 and collector/conveyor 24. Boom assembly 42 and mobile means 44 can be any type of conventional equipment and assembly 42 can be mounted rigidly or pivotally. As seen in FIG. 1, rods 2 are held in position by upper frame member or rod-positioning plate 4 and lower frame member or rod-positioning plate 6. Each rod 2 is provided with rubber tip 3 and is prevented from sliding downward out of frame members 4 and 6 by pin 8 which is inserted through rod 2 perpendicular to its longitudinal axis and near its top. Frame members 4 and 6 are maintained parallel to and a predetermined distance from each other by spacers 10. The triangular pattern and equal spacing of the rods is shown in FIG. 2 and again in the sectional top view in FIG. 3. The equidistant spacing of rods 2 is accomplished by maintaining the distance ratio shown in FIG. 3. Also shown in FIG. 2 are handles 30 which are provided for use when the apparatus is used manually. Since handles 30 can be attached to the apparatus in a number of obvious ways, the manner in which this is accomplished is not critical. When the apparatus is used in conjunction with a tractor or other type of mobile unit, handles 30 are removed. Although hold-down and release mechanism 12 is illustrated in FIGS. 1 and 2, it is shown in more detail in FIGS. 4 and 5. The mechanism has a tensioning bolt 14, a compression spring 16, a force transmission link or block 18, a washer or other suitable bearing surface 17, and two hold-down tabs 20. Under the normal resistance met by rods 2 when the apparatus is operating through a fruiting canopy and pressing off the desired fruit, the pressure exerted by tabs 20 is sufficient to keep rods 2 in their initial operating position as shown in FIG. 4. However, when a rod 2 engages a non-yielding object such as a branch or limb an upward pressure is exerted against the tab 20 holding it in operating position thereby forcing it into tab released position as shown in FIG. 5 and allowing rod 2 to remain stationary while the harvester continues operating. This allows the harvester to continue its full downward movement through the fruiting canopy without interference from the non-yielding branch or limb. After completing the downward movement through the fruiting canopy, the apparatus is pulled upward out of the canopy. Upon being pulled out of the canopy, any rod 2 which had engaged a non-yielding object and projects above upper frame member 4 (FIG. 5) is returned to its initial position as shown in FIG. 4 and hold-down and release mechanisms 12 automatically reset to the position shown in FIG. 4. When the apparatus is being operated manually with the use of handles 30, the upwardly projecting rods are pushed down by hand. However, when the apparatus is attached to a tractor or mobile unit it is provided with rod repositioning mechanism 32 which is described hereafter. Thus the harvester is then ready for the next downward pass through another section of a fruiting canopy.

As previously noted, rod hold-down and release mechanism 12 is comprised of tensioning bolt 14, compression spring 16, forced transmission link or block 18, washer 17 and tabs 20. Mechanism 12 is a key and novel element in the subject invention and is an element not found in other known apparatus for removing fruits or other edibles from trees. The mechanism provides a unique means of varying the pressing force which the rods or fingers exert against the fruit. The pressing force is varied by adjusting tensioning bolt 14 which transmits the desired force to the top of rods 2 through compression spring 16, washer 17, transmission block 18, and tabs 20. Tabs 20, as shown in FIGS. 4 and 5, are pivotally attached to forced transmission block or link 18. This mechanism allows the apparatus to be used to remove only fruit which meets a particular predetermined criteria such as a particular crop, the degree of ripeness or type of fruit. The mechanism also provides a unique means of preventing damage to limbs or branches of trees as the apparatus moves downward through the fruiting canopy. This is accomplished by allowing a rod(s) 2 to remain stationary when it engages a non-yielding object while the harvester continues and completes its downward passage through the canopy thereby achieving the objective of removing the desired fruit. The forces applied through a tab 20 when it is in released position and when it is in initial position are shown in FIGS. 6 and 7 in which Fs is the force from the spring (adjustable), Fr is the force exerted on the rod, and Fp is the force exerted on the upper frame member.

Figure 8:
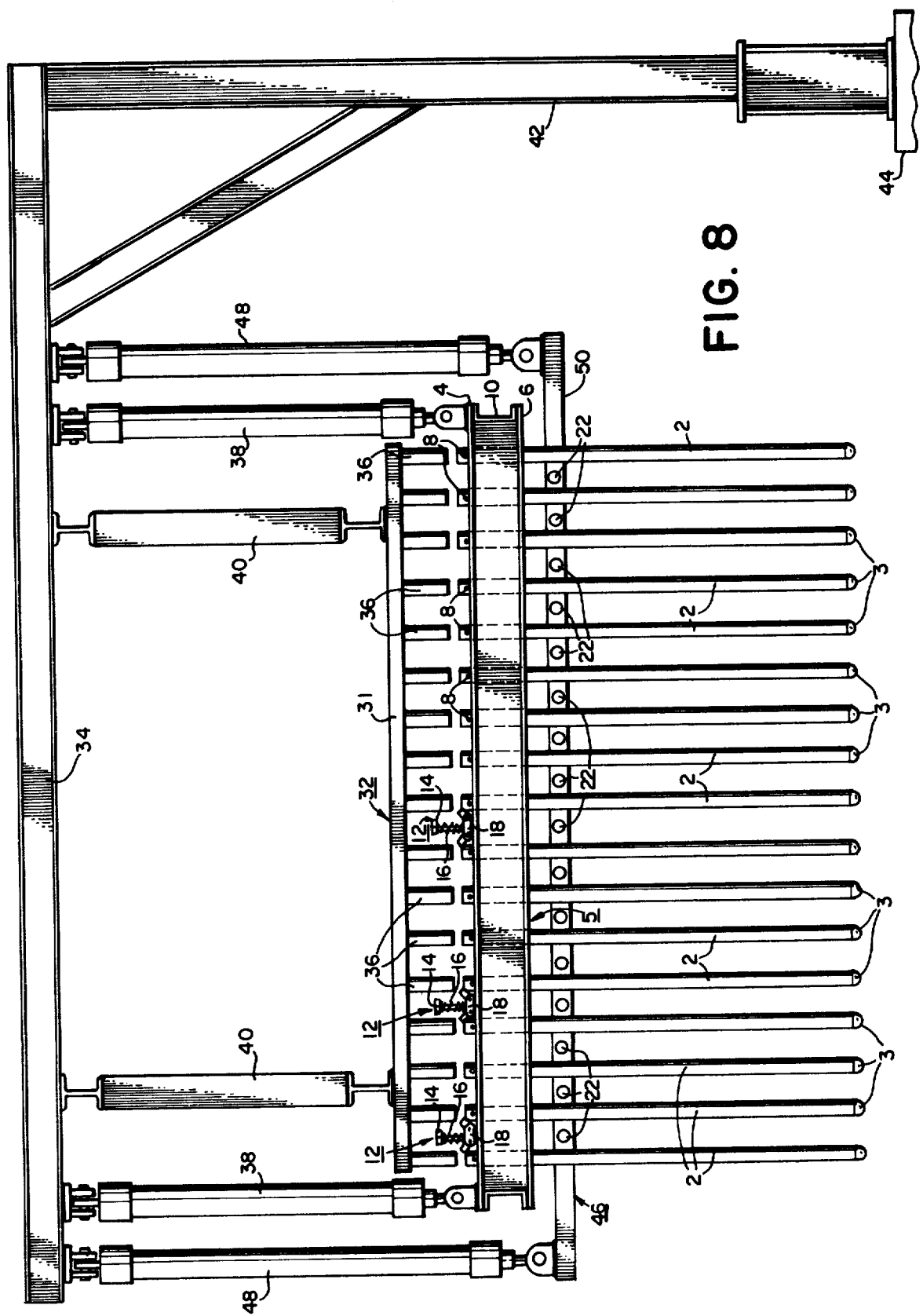
FIG. 8 is a side view of the apparatus when it is integrated with and operated from a suitable mobile means. As shown, the apparatus is in the initial operating position.

As noted above, during the harvesting operation a rod(s) 2 sometimes engages a non-yielding object. When this happens, tab(s) 20 over the so-engaged rod(s) 2 releases to the position shown in FIG. 5 and while engaged rod(s) 2 remains stationary against the object, frame members 4 and 6 slide over it and with non-engaged rods 2 continue their full movement into the canopy without interference from the non-yielding object. Consequently, when the harvester is retracted from the canopy, any rod(s) 2 which has been so-engaged projects above upper frame member 4 as shown in FIGS. 5 and 8a. Rod repositioning mechanism 32 (FIGS. 8 and 8a) is provided to automatically reposition any upwardly projecting rods into their initial operating positions. Mechanism 32 is comprised essentially of a flat stationary plate 31 having studs 36 on its lower side and is attached to and supported by frame 34 of the harvester through supporting bars 40 as shown in FIGS. 8 and 8a. Rod repositioning mechanism 32 is located above frame member 4 and plate 31 is parallel to and has the same dimensions of length and width as that of frame members 4 and 6. The lower surface of plate 31 is provided with short studs 36 which are spaced and positioned in a pattern identical to that of rods 2 in frame members 4 and 6 so that there is a stud 36 over the top of each rod 2. When rods 2 are in initial operating position there is a slight clearance between the top of each rod 2 and the bottom of the correspondingly positioned stud 36. In a harvesting operation hydraulically operated cylinders 38, which, as shown in FIG. 8, connect mechanism 5 and frame 34, are activated through a conventional hydraulic circuit and as they open or lengthen out mechanism 5 moves into the fruiting canopy while rod repositioning mechanism 32 remains stationary with harvester frame 34. When rods 2 have moved completely through the section of the fruiting canopy being harvested, cylinders 38 are activated to close and retract mechanism 5 from the canopy. As mechanism 5 is retracted from the canopy the top of any rod 2 which, at this stage of the operation, is projecting above frame member 4 will contact a stud 36 and be automatically repositioned into its initial operating position as shown in FIG. 4 when mechanism 5 is fully retracted. Actually, the rods are not fully repositioned into initial operating position by mechanism 32. When mechanism 32 has pushed rod 2 down to the point where the top surface 50 of rod 2 meets or is very slightly below leading edge 52 (FIG. 5) of hold-down tab 20, the force exerted by tab 20 completes the repositioning of rod 2 into its initial operating position.

Occasionally during fruit removal operations, a limb or other object becomes entangled or enmeshed in the plurality of rods in such a manner that the apparatus cannot be raised out of the fruiting canopy without pulling and possibly damaging the limb or object. In order to provide for such a contingency, the apparatus is provided with retraction-assist mechanism 46 as shown in FIGS. 8 and 8a and section view 8b. Mechanism 46 is comprised essentially of one or more supporting bars 50 or other suitable substitute, one or more rods 22 removably attached to bar 50 and hydraulically operated cylinders 48 which connect bar 50 to frame 34. Bar 50 is positioned so that rods 22 are below and generally parallel to lower frame member 6. Rods 22 are positioned between rods 2, and their longitudinal axes are parallel to the surface of frame members 4 and 6 and therefore perpendicular to the longitudinal axes of rods 2. The number of rods 22 that are used in the mechanism for any operation depends on the particular canopy being harvested. In some cases one rod 22 may suffice while other circumstances may require three or four rods 22 or even, as shown in the figures, a rod 22 between each row of rods 2. Mechanism 46 is also operated by a conventional hydraulic circuit which is designed to lower supporting bar 50 and rod(s) 22 at the same time and at the same rate of movement that mechanism 5 is lowered toward the fruiting canopy to be harvested. FIG. 8a shows the positions of the various parts of the apparatus when fruit harvesting rods 2 are extended and also shows one rod 2 projecting above frame member 4. The hydraulic circuitry is also designed to hold mechanism 46, or more specifically bar 50 and rod(s) 22, in place against the canopy while mechanism 5 is retracted. In this manner limbs or other objects which are caught in or tend to be pulled up by rods 2 are stripped from fruit removing rods 2 thereby freeing the apparatus of them and preventing damage to the canopy. When rods 2 are fully retracted from the canopy, cylinders 48 close and retraction-assist mechanism 46 is returned to its initial position in which rod(s) 22 is directly under lower frame member 6. As noted the hydraulic circuitry which operates mechanisms 46 and 5 is conventional and not part of the inventive concept of this invention and therefore the details of the circuitry need not be described. It is designed to open and close cylinders 38 and 48 at the proper times so that the harvester will operate efficiently. In FIG. 8, rod supporting bar 50 is shown positioned outside the dimensions of members 4 and 6 with rods 22 projecting through rods 2. However, bar 50 can be positioned within the dimensions of members 4 and 6 provided that it does not interfere with the function of rods 2. When positioned other than as shown, it may be necessary that rods 22 project from both sides of bar 50 rather than from one side as shown in FIG. 8. In some instances it may be necessary or advisable to provide support at both ends of rod(s) 22. A second bar 50 on the side of the apparatus opposite to the side on which first bar 50 is located will provide such support. However, it is contemplated that such support would rarely be needed.

Figure 9:
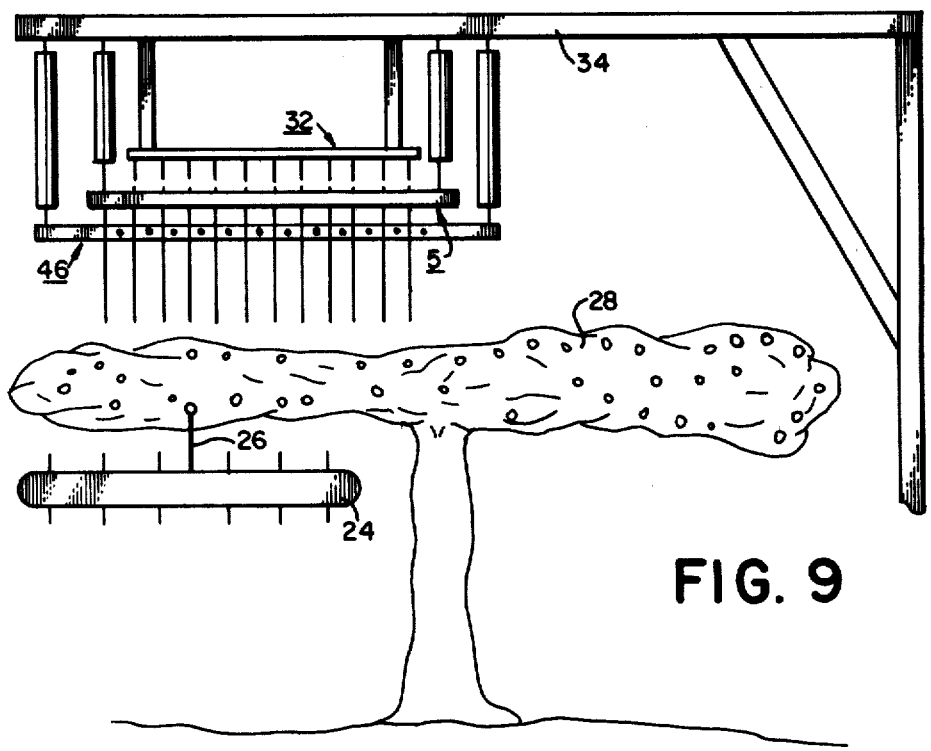
FIG. 9 is a generally schematic illustration showing the rod press harvester in position to be used on a horizontally trained fruiting canopy. A collector/conveyor and canopy support are also illustrated.

An energy absorbing collector/conveyor 24, as illustrated in FIG. 9, is also provided for catching and collecting the removed fruit. Collector/conveyor 24 can be an integral part of the apparatus of this invention or it can be a separate individual piece of equipment for use in conjunction with the apparatus. Canopy support device 26, as illustrated being used with horizontally trained canopy 28 in FIG. 9, is provided in the event that the fruiting canopy is not stiff or rigid enough or is too flexible to remain in position while rods 2 of the apparatus are pushed downward through the canopy. Canopy support device 26 prevents the canopy from being pushed away from rods 2 and allows the apparatus to move through and remove fruit from the canopy. Device 26 may be a simple straight rod or a rod with a T-shaped or Y-shaped terminus or any configuration that will accomplish the desired purpose. The only requirement for device 26 is that it is strong enough and rigid enough to adequately support a fruiting canopy. As shown in FIG. 9, canopy support 26 may be connected to collector/conveyor 24. Since many canopies require no support for the operation of the apparatus of this invention, a preferred arrangement is to have support 26 removably attached to collector/conveyor 24. In this arrangement, it can be attached only when needed.

The fruit removal apparatus of this invention is very flexible and can be adapted to different size fruit growing conditions simply by changing the size of the frame members 4 and 6 to accommodate a larger or smaller plurality of fruit removing rods or fingers. The flexibility of the apparatus also extends to the size of the fruit removed which can be varied by changing the diameter and spacing of rods 2.

As previously noted, the apparatus of this invention is also provided with a handle device 30 and thus can be operated manually by two persons. However, it may also be integrated with various types of mobile equipment and be the prime component in a mobile unit. When the apparatus is manually operated neither rod-repositioning mechanism 32 nor retraction-assist mechanism 46 are used. Rods 2 are repositioned and limbs or other obstructions are cleared out manually.

Figure 10:
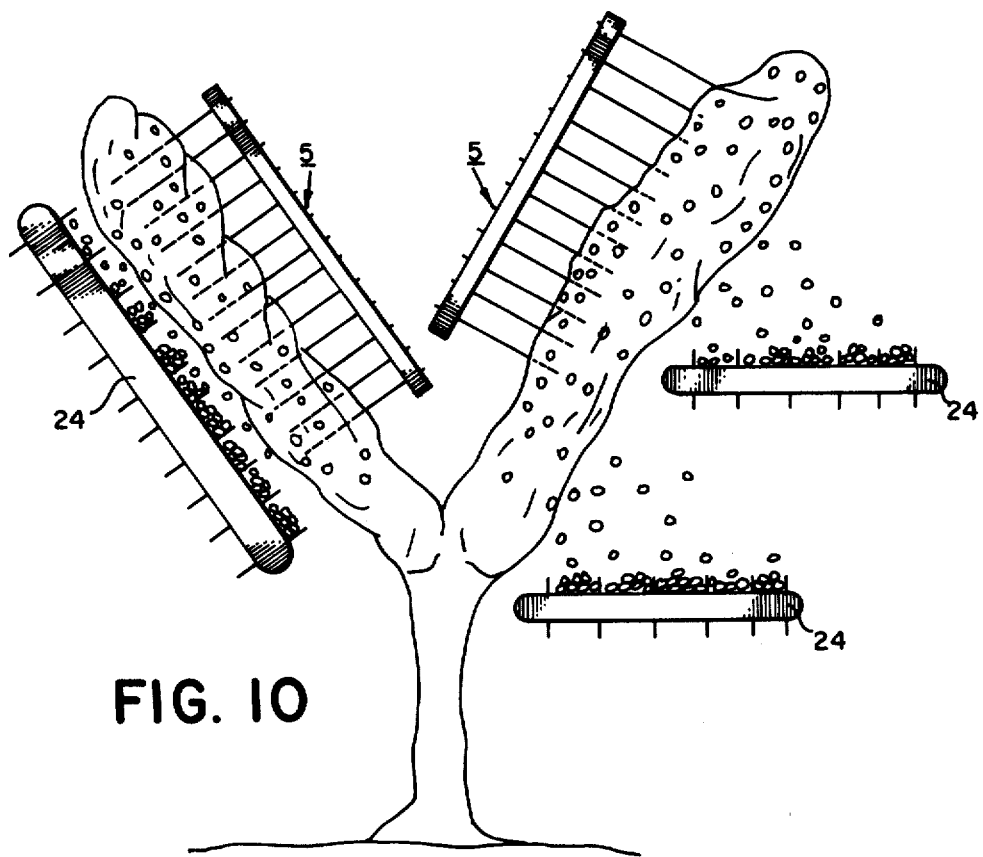
FIG. 10 is a generally schematic illustration showing how the apparatus is used on a V-shaped canopy. A collector/conveyor is illustrated in two modes, following the plane of the canopy on the left and in a horizontal position on the right.

The apparatus has been described above as being used in a vertical or downward posture or movement through a fruiting canopy. However as illustrated in FIG. 10, it is easily used in other directions and postures which may be required with some V-shaped or other shape of fruiting canopy. Different types and arrangements of collector/conveyors 24 that may be used with V-shaped canopies are also illustrated in FIG. 10.

Frame 34 is any type of conventional frame that will provide the necessary support for the functioning parts of the apparatus and therefore it is not considered necessary to describe it in detail. These are various types of equipment and various ways known in the art to provide the support required of frame 34, any of which will suffice for the apparatus of this invention. It is also contemplated that the number of supports and hydraulic cylinders needed to operate the apparatus will vary with the requirements of the particular harvesting task for which the invention is used. In most cases four supportings bars 40 and four each of cylinders 38 and 48 would be used. However, under certain circumstances only two of the above bars and cylinders may be required, while under other circumstances more than four would be needed. This in no way affects the novelty and unobviousness of the invention.

Although tips 3 are made of rubber, other suitable materials that do not harm the fruit or the tree may be substituted.

I claim:

1. A rod press fruit harvesting apparatus, comprising
   (a) a frame;
   (b) a rod press fruit removal mechanism for pressing fruit from a fruiting canopy, said mechanism having a plurality of fruit-removing rods and being movably joined to said frame;
   (c) a plurality of spring tensioned rod hold-down and release mechanisms mounted on the fruit removal mechanism, said rod hold-down and release, mechanism being disposed to exert a force against said fruit-removing rods;
   (d) a retraction-assist mechanism movably joined to the frame, said retraction-assist mechanism being adapted to move in conjunction with the fruit removal mechanism; and
   (e) a fruit-removal rod repositioning mechanism joined to the frame and disposed above the fruit removal mechanism, said rod repositioning mechanism having a plurality of studs on its lower surface.

2. The apparatus of claim 1 wherein the frame is supported by a boom assembly pivotally attached to a mobile means.

3. The apparatus of claim 2 wherein the force exerted by the rod hold-down and release mechanism can be adjusted to provide for different forces required for harvesting various crops.

4. The apparatus of claim 3 wherein the retraction-assist mechanism is provided with at least one rod, the longitudinal axis of said rod being disposed in a generally perpendicular attitude with respect to the fruit-removing rods.

5. The apparatus of claim 4 wherein each spring tensioned rod hold-down and release mechanism has two hold-down and release tabs pivotally mounted on a forced transmission block, said tabs and block being subjected to a predetermined force applied through a force bearing surface by a tensioning bolt and compression spring.

6. A rod press fruit harvesting apparatus, comprising:
(a) a frame;
(b) a rod press fruit removal mechanism comprised of a plurality of fruit removing rods and a pair of frame members for removably holding and supporting said rods, said frame members being generally parallel to each other, said fruit removal mechanism being movably joined to said frame;
(c) a plurality of spring tensioned rod hold-down and release mechanisms mounted on the upper of the aforesaid frame members, each of said mechanisms being disposed to exert a force against two of the aforesaid fruit removing rods;
(d) a retraction-assist mechanism disposed parallel to and lower than and at least partially outside the dimensions of the aforesaid fruit removal mechanism, said mechanism being movably joined to the frame for movement in conjunction with the movement of the aforesaid fruit removal mechanism; and
(e) a fruit removing rod repositioning mechanism disposed above and parallel to the frame members of the aforesaid fruit removal mechanism, said rod repositioning mechanism having a flat plate with a plurality of short studs on its lower surface, each stud being positioned so that it is directly above one of the aforesaid fruit removing rods, said mechanism being joined to the frame.

7. A harvesting apparatus as claimed in claim 6 in which the rods are rigid and have longitudinal axes and substantially circular cross-sections.

8. A harvesting apparatus as claimed in claim 7 in which the rods are equally spaced in triangular pattern.

9. A harvesting apparatus as claimed in claim 8 in which the rod press fruit removal mechanism is joined to the frame by hydraulically operated cylinder.

10. A harvesting apparatus as claimed in claim 6 in which the spring tensioned rod hold-down and release mechanism is comprised of a tensioning bolt, a compression spring, a forced transmission block, a force bearing surface and two rod hold-down and release tabs, each of said tabs being pivotally mounted at opposite ends of said forced transmission block and said tabs and forced transmission block being subjected to a predetermined force applied through said bearing surface by said tensioning bolt and compression spring.

11. A harvesting apparatus as claimed in claim 6 in which the retraction-assist mechanism is comprised of at least one rod removably attached to at least one suitable support, said retraction-assist mechanism being disposed so that the rod is underneath and parallel to the lower frame member and said retraction-assist mechanism being movably joined to the frame by hydraulically operated cylinder.

12. A harvesting apparatus as claimed in claim 6 in which the hydraulic means joining the rod press fruit removal mechanism with the frame and the hydraulic cylinder joining the retraction-assist mechanism to the frame are adapted to lower both the fruit removal and retraction-assist mechanisms at the same time and at the same rate of movement and to delay retraction of the retraction-assist mechanism until the fruit removal mechanism is retracted.

13. A rod press fruit harvesting apparatus, comprising:
(a) a frame supported by a boom assembly pivotally attached to a mobile means;
(b) a rod press fruit removal mechanism movably joined to the frame by hydraulically operated cylinder, said fruit removal mechanism having a plurality of fruit-removing rods and a pair of frame members for removably holding and supporting said rods, said frame members being generally parallel to each other, said fruit-removing rods being rigid and having longitudinal axes and substantially circular cross-sections and being equally spaced in a triangular pattern in the frame members;
(c) a plurality of spring tensioned rod hold-down and release mechanisms mounted on the fruit removal mechanism, each of said rod hold-down and release, mechanisms being disposed to exert a force against two of the fruit-removing rods and each of said rod hold-down and release, mechanisms being comprised of a tensioning bolt, a compression spring, a forced transmission block, a force bearing surface and a pair of rod hold-down and release tabs, each of said tabs being pivotally mounted on the forced transmission block and said tabs and forced transmission block being subjected to a predetermined force applied through said force bearing surface by the tensioning bolt and compression spring;
(d) a retraction assist mechanism comprised of at least one rod removably attached to a suitable support, said also retraction assist, mechanism being disposed so that the rod is below and parallel to the frame members, said retraction assist, mechanism being movably joined to the frame by hydraulically operated cylinder, said hydraulically operated cylinder being adapted to lower the retraction assist, mechanism at the same time and at the same rate of movement as the rod press fruit removal retraction assist, mechanism is lowered and to delay retraction of the mechanism until the fruit removal mechanism is retracted; and
(e) a fruit-removing rod repositioning mechanism disposed above and generally parallel to the frame members of the aforesaid fruit removal mechanism, said rod repositioning mechanism having a flat plate with a plurality of studs on its lower surface, said studs being spaced equally in the same triangular pattern as the aforesaid fruit removing rods so that each stud is positioned directly above one of the rods, said rod repositioning mechanism being joined to the frame.

14. A method of harvesting fruit comprising (a) pressing the desired fruit from a fruiting canopy by lowering into the canopy an apparatus comprised of
  (1) a frame;
  (2) a rod press fruit removal mechanism for pressing fruit from a fruiting canopy, said fruit removal, mechanism having a plurality of fruit removing rods and being movably joined to said frame;
  (3) a plurality of spring tensioned rod hold-down and release mechanisms mounted on the fruit removal mechanism, said rod hold-down and release mechanism being disposed to exert a force against said fruit-removing rods;
  (4) a retraction-assist mechanism movably joined to the frame, said retraction assist mechanism being adapted to move in conjunction with the fruit removal mechanism; and
  (5) a fruit removal rod repositioning mechanism joined to the frame and disposed above the fruit removal mechanism, said rod repositioning mechanism having a plurality of studs for repositioning the fruit-removing rods; and
(b) collecting the removed fruit in an energy-absorbing collector/conveyor.

* * * * *